(12) United States Patent
Park et al.

(10) Patent No.: US 12,197,250 B2
(45) Date of Patent: Jan. 14, 2025

(54) DISPLAY DEVICE WITH SUPPORT FILM

(71) Applicant: SAMSUNG DISPLAY CO., LTD., Yongin-si (KR)

(72) Inventors: Sang Hyo Park, Suwon-si (KR); Chan Hui Han, Seongnam-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 119 days.

(21) Appl. No.: 17/817,345

(22) Filed: Aug. 3, 2022

(65) Prior Publication Data
US 2023/0205272 A1 Jun. 29, 2023

(30) Foreign Application Priority Data
Dec. 23, 2021 (KR) .................. 10-2021-0185637

(51) Int. Cl.
*G06F 1/16* (2006.01)

(52) U.S. Cl.
CPC .......... *G06F 1/1652* (2013.01); *G06F 1/1656* (2013.01)

(58) Field of Classification Search
CPC .... G06F 1/1652; G06F 1/1656; G06F 1/1624; G06F 1/1637; Y02E 10/549; H10K 59/12; H10K 59/871; H10K 77/111; H10K 50/841; H10K 2102/311
See application file for complete search history.

(56) References Cited

U.S. PATENT DOCUMENTS

| | | | | |
|---|---|---|---|---|
| 10,783,809 B2* | 9/2020 | Kim | .................. | G09F 9/301 |
| 10,798,831 B2* | 10/2020 | Shin | .................. | H05K 5/0217 |
| 2008/0018631 A1* | 1/2008 | Hioki | .................. | G02F 1/133526 |
| | | | | 345/206 |
| 2013/0010405 A1* | 1/2013 | Rothkopf | .................. | H05K 5/0226 |
| | | | | 361/679.01 |
| 2016/0271914 A1* | 9/2016 | Xie | .................. | B32B 3/16 |
| 2016/0306392 A1* | 10/2016 | Park | .................. | G06F 3/041 |
| 2017/0156219 A1* | 6/2017 | Heo | .................. | G06F 1/1679 |
| 2018/0124931 A1* | 5/2018 | Choi | .................. | G09F 9/301 |
| 2020/0383219 A1* | 12/2020 | Hale | .................. | E05D 3/122 |
| 2021/0007229 A1* | 1/2021 | Gu | .................. | G06F 1/1601 |
| 2021/0118337 A1* | 4/2021 | Park | .................. | G09F 9/301 |
| 2022/0399521 A1* | 12/2022 | Kang | .................. | B32B 3/30 |
| 2023/0080858 A1* | 3/2023 | Lee | .................. | G06F 1/1641 |
| | | | | 361/807 |
| 2023/0095247 A1* | 3/2023 | Feng | .................. | G09F 9/301 |
| | | | | 361/679.27 |
| 2023/0101087 A1* | 3/2023 | Li | .................. | G06F 1/1643 |
| | | | | 257/40 |

(Continued)

FOREIGN PATENT DOCUMENTS

| | | |
|---|---|---|
| JP | 2019-003099 | 1/2019 |
| KR | 10-2018-0025358 | 3/2018 |
| KR | 10-2020-0019000 | 2/2020 |

*Primary Examiner* — Rockshana D Chowdhury
(74) *Attorney, Agent, or Firm* — F. CHAU & ASSOCIATES, LLC

(57) ABSTRACT

A display device is provided. A display device includes a display panel with bendable portions; a support film attached on a bottom surface of the display panel; a first adhesive layer disposed on a bottom surface of the support film; and a plurality of segments disposed on a bottom surface of the first adhesive layer and spaced apart from one another in a first direction, wherein the support film has a smaller elastic modulus than the first adhesive layer.

19 Claims, 15 Drawing Sheets

(56) References Cited

U.S. PATENT DOCUMENTS

| | | | |
|---|---|---|---|
| 2023/0123422 A1* | 4/2023 | Bi | G09F 9/30 |
| | | | 361/807 |
| 2023/0138250 A1* | 5/2023 | Zhang | B32B 7/02 |
| | | | 428/213 |
| 2023/0161375 A1* | 5/2023 | Jeong | G06F 1/1601 |
| | | | 361/679.01 |
| 2023/0164929 A1* | 5/2023 | Kim | G06F 1/1637 |
| | | | 361/807 |
| 2023/0165125 A1* | 5/2023 | Duan | H10K 59/8722 |
| | | | 257/40 |
| 2023/0171901 A1* | 6/2023 | Chen | G06F 1/1652 |
| | | | 361/807 |
| 2023/0240093 A1* | 7/2023 | Kim | H10K 77/111 |

* cited by examiner

DISPLAY DEVICE WITH SUPPORT FILM

CROSS-REFERENCE TO RELATED APPLICATION

This application claims priority under 35 U.S.C. § 119 to Korean Patent Application No. 10-2021-0185637 filed on Dec. 23, 2021 in the Korean Intellectual Property Office, the disclosure of which is hereby incorporated by reference in its entirety.

TECHNICAL FIELD

The disclosure relates to a display device. More particularly, the present disclosure relates to a display device including a support film.

DISCUSSION OF THE RELATED ART

Display devices are used to facilitate the transfer of information to users. For example, display devices have been employed in various electronic devices such as smartphones, digital cameras, laptop computers, navigation devices, and smart televisions. Several types of display devices have been developed, such as organic light-emitting diode (OLED) display devices, liquid crystal display (LCD) devices, and the like.

Recently, various types of flexible displays have been developed. Flexible displays can be folded, bent, or slid to adjust the display area, which allows reduced size for display devices and increased diversification of designs.

SUMMARY

A display device includes a display panel including bendable portions; a support film attached on a bottom surface of the display panel; a first adhesive layer disposed on a bottom surface of the support film; and a plurality of segments disposed on a bottom surface of the first adhesive layer and spaced apart from one another in a first direction, wherein the support film has a smaller elastic modulus than the first adhesive layer.

The support film may have an elastic modulus of 5 MPa or less.

The support film may include a thermosetting polymer.

The first adhesive layer may have an adhesiveness of 500 gf/inch or greater.

The display device may further include a flat portion of the display panel, wherein the flat portion remains flat during a closed state, and wherein the bendable portions of the display panel are bent in the closed state, wherein each of the bendable portions includes a maximum bend location where the display panel is bent to its maximum in the closed state, the support film has a first surface, which is adjacent to the bottom surface of the display panel, and the first surface of the support film has a strain magnitude of 5% or greater at the maximum bend location.

The first adhesive layer may have a second surface, which is adjacent to the support film, and the second surface of the first adhesive layer may have a shear strain of 100% or less in the bendable portions.

The display panel may include a first area, a second area, and a third area. The first area is a flat area, and is configured to remain flat in an opened state and a closed state of the display device. The second area is disposed on a first side of the first area, and is configured to bend or curve when the display device transitions from the opened state to the closed state. The third area is disposed on a second side of the first area opposite the first side, and is configured to bend or curve when the display device transitions from the opened state to the closed state. The segments overlap with the second and third areas in the thickness direction, but do not overlap with the first area in the thickness direction.

The segments may extend in a second direction which is orthogonal to the first direction and the thickness direction.

The display device may further include a plate part disposed on the first adhesive layer and which overlaps with the first area in the thickness direction, but does not overlap the second and third areas, wherein a thickness of the plate part is less than a thickness of the segments.

The display device may further include an air gap disposed below the plate part.

A display device includes a display panel configured to slide in a first direction and including a flat portion, a first bendable portion, and a second bendable portion; a support film attached on a bottom surface of the display panel; and a plurality of segments disposed on a bottom surface of the support film and spaced apart from one another, wherein the plurality of segments overlap the first bendable portion and the second bendable portion in a thickness direction, and wherein the support film includes a thermosetting polymer.

The support film may include a cross-linked polymer.

The support film may have an elastic modulus of 5 MPa throughout a temperature range of −20° C. to 85° C.

The support film may have a substantially constant modulus throughout a temperature range of −20° C. to 85° C.

The display device may further include, a first adhesive layer disposed between the support film and the segments, wherein the first adhesive layer has a greater elastic modulus than the support film.

The first adhesive layer has an adhesiveness of 500 gf/inch.

The display panel may further include a first area, a second area, and a third area, wherein the first area overlaps with the flat portion of the display device in the thickness direction, and is configured to remain flat in an opened state and a closed state of the display device, wherein the second area is disposed on a first side of the first area and overlaps with the first bendable portion of the display device in the thickness direction, and is configured to bend or curve when the display device transitions from the opened state to the closed state, wherein the third area is disposed on a second side of the first area opposite the first side and overlaps with the second bendable portion of the display device in the thickness direction, and is configured to bend or curve when the display device transitions from the opened state to the closed state, and wherein the segments overlap with the second and third areas, but not with the first area.

The segments may extend in a second direction orthogonal to the first direction and the thickness direction, and wherein the segments are spaced apart from one another in the first direction.

The display device may further include a plate part disposed on the first adhesive layer and overlapping the flat portion of the display panel in the thickness direction, wherein a thickness of the plate part is less than a thickness of the segments.

The display device may further include an air gap disposed below the plate part.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

Embodiments of the present disclosure will now be described more fully hereinafter with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art.

It will also be understood that when a layer is referred to as being "on" another layer or substrate, it can be directly on the other layer or substrate, or intervening layers may also be present. The same reference numbers may indicate the same components throughout the specification, and to the extent that a description of an element has been omitted, it may be understood that the element is at least similar to corresponding elements that are described elsewhere in the specification.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

Features of each of various embodiments of the present disclosure may be partially or entirely combined with each other and may technically variously interwork with each other, and respective embodiments may be implemented independently of each other or may be implemented together in association with each other.

The components, features, relative lengths, angles, etc. as illustrated in the attached drawings are intended to represent at least some embodiments of the present disclosure, and although variations may be made within the scope of the present disclosure, what is shown should be understood to be at least one such embodiment.

Hereinafter, embodiments of the disclosure will be described with reference to the attached drawings.

Figure 1:
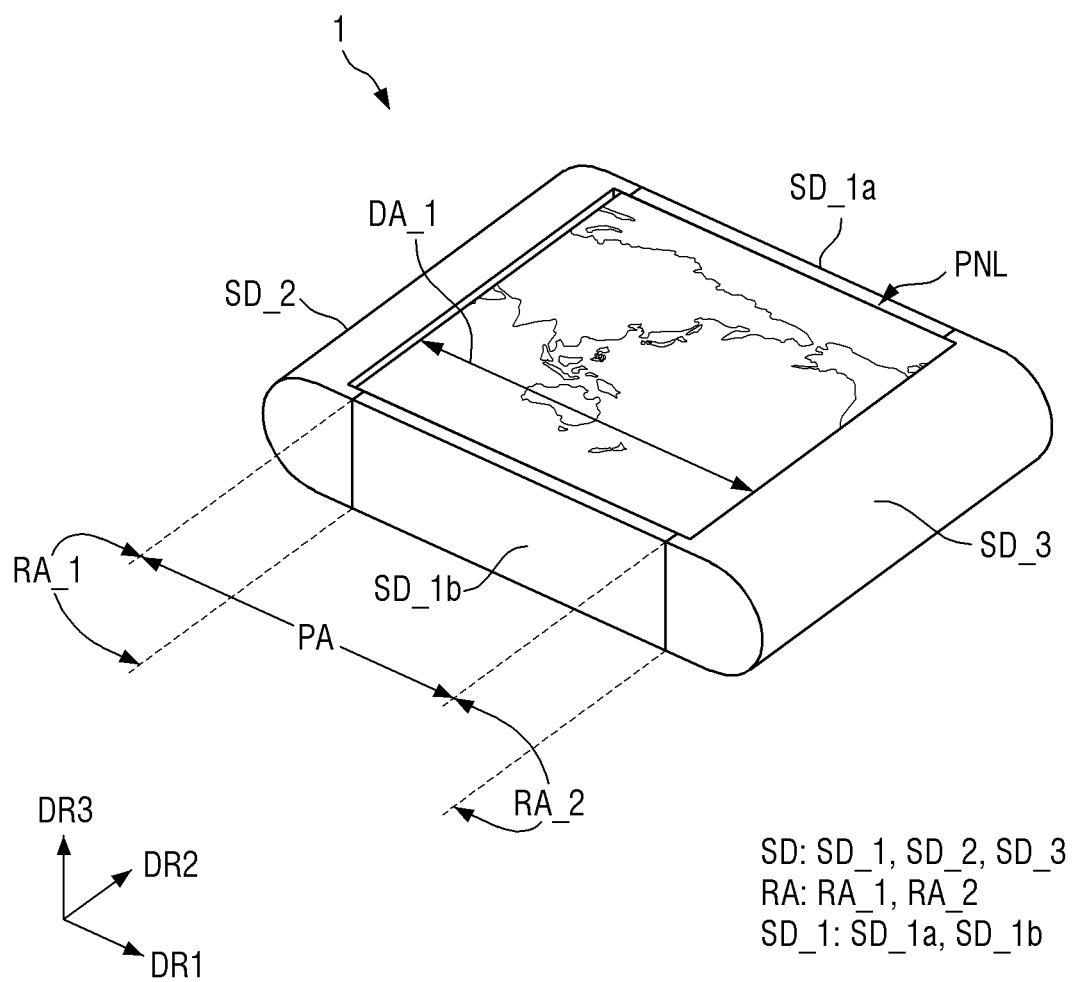
FIG. 1 is a perspective view that illustrates a display device according to an embodiment of the disclosure.
Figure 2:
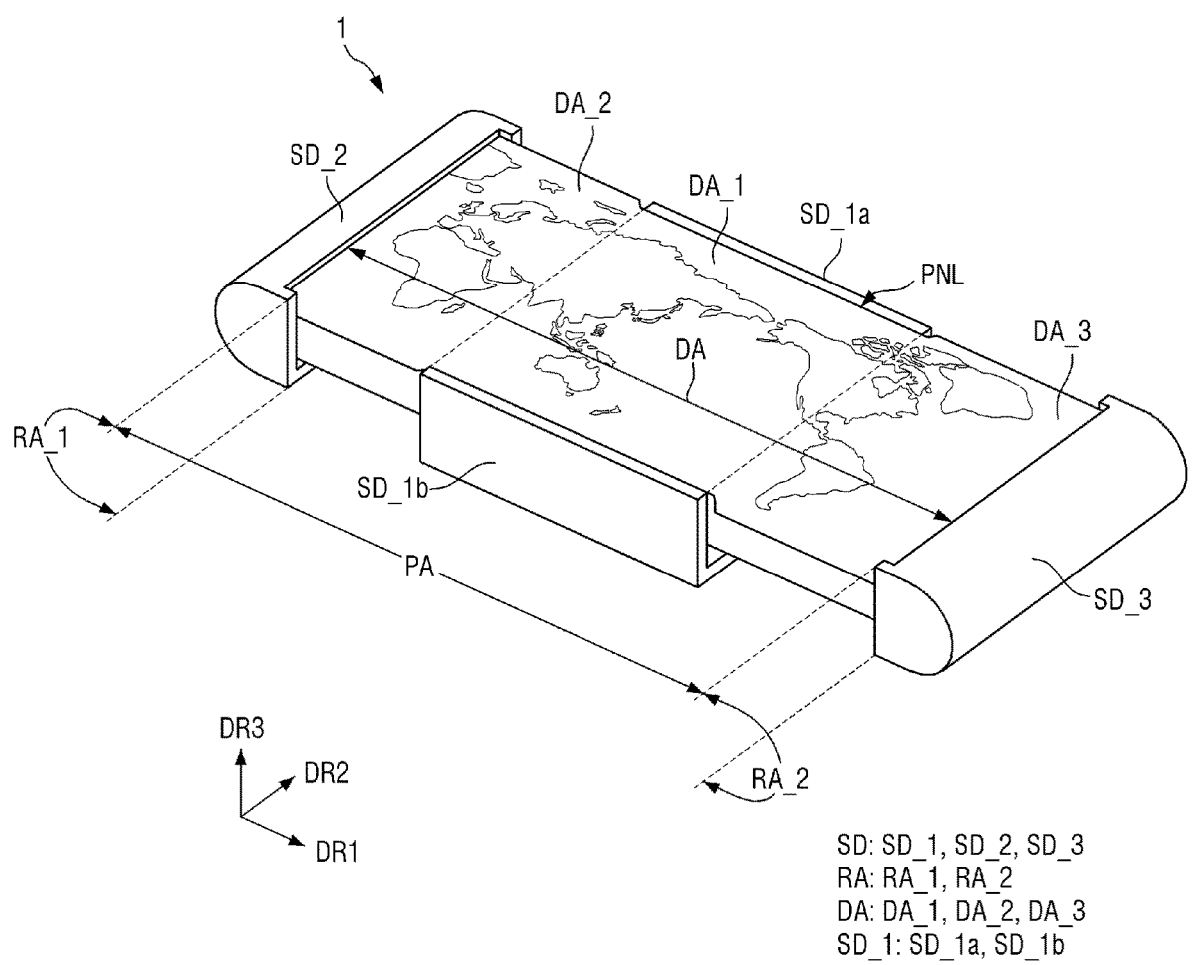
FIG. 2 is a perspective view that illustrates the display device of FIG. 1 in an expanded state.
Figure 3:
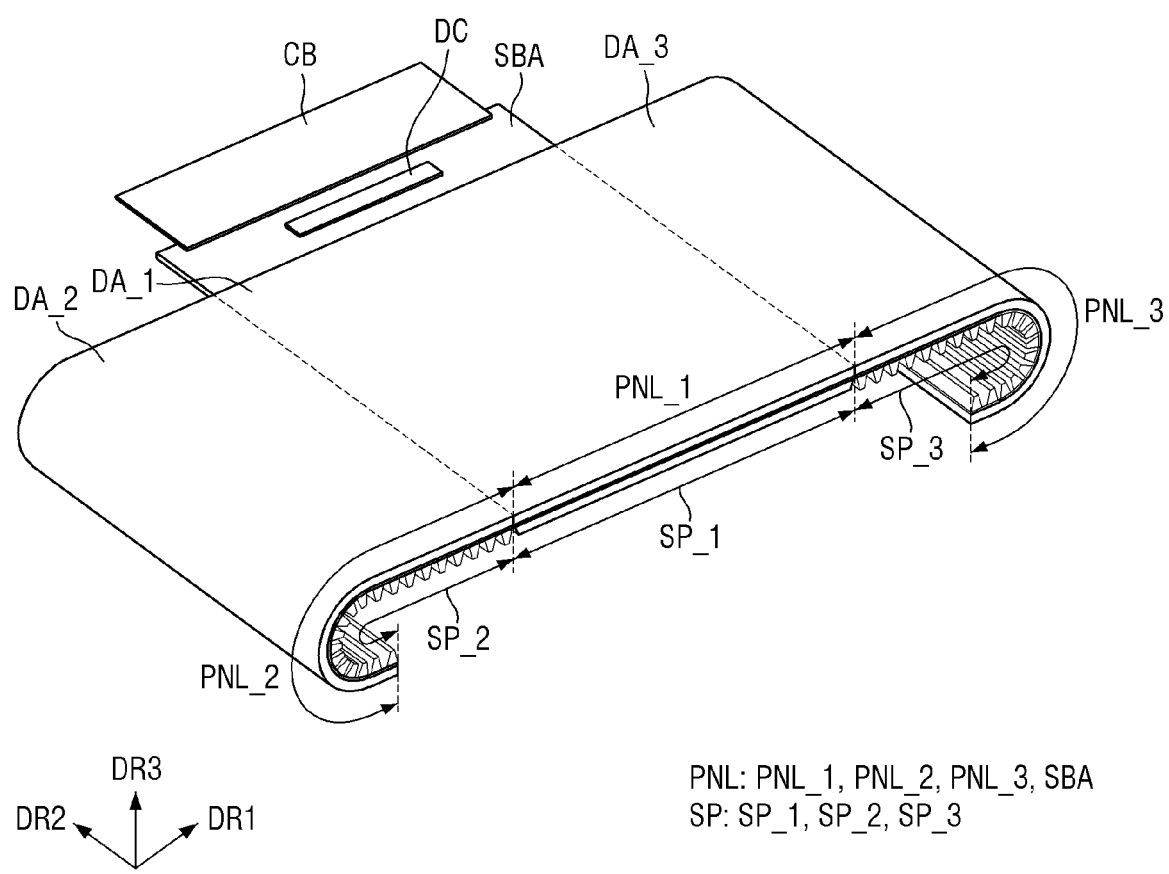
FIG. 3 is a perspective view of a display panel of the display device of FIG. 1.
Figure 4:
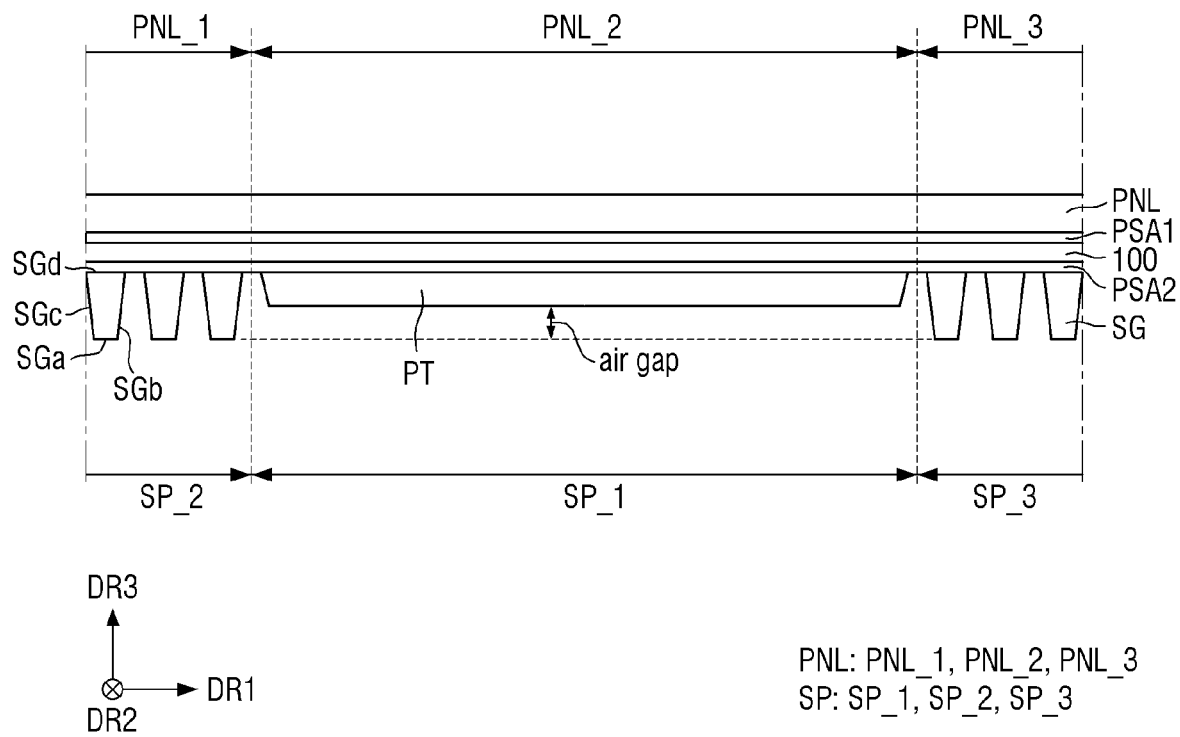
FIG. 4 is a side view that illustrates how the display panel and a support module of FIG. 3 are stacked, as viewed from a second direction.

FIG. 1 is a perspective view that illustrates a display device according to an embodiment of the disclosure. FIG. 2 is a perspective view that illustrates the display device of FIG. 1 in its expanded state. FIG. 3 is a perspective view of a display panel of the display device of FIG. 1. FIG. 4 is a side view that illustrates how the display panel and a support module of FIG. 3 are stacked, as viewed from a second direction.

Referring to FIGS. 1 and 2, a display device 1 may be a sliding or slidable display device. The display device 1 may be a multi-slidable display device that is slidable in both directions, but the disclosure is not limited thereto. For example, the display device 1 may be a single-slidable display device that is slidable only in one direction. The display device 1 will hereinafter be described as being a multi-slidable display device. For example, the display device 1 may include a screen that slides out from a left side and a right side, when viewed from the perspective of a user operating the device.

The display device 1 may have a three-dimensional (3D) shape. For example, the display device 1 may have a rectangular shape or a 3D shape similar to a rectangular shape, for example, a substantially rectangular shape that is extended in a thickness direction. A direction parallel to a first side of the display device 1 may be referred to as a first direction DR1, a second side of the display device 1 may be referred to as a second direction DR2, and the thickness direction of the display device 1 may be referred to as a third direction DR3. Unless otherwise specified, a particular direction may refer to both sides in the particular direction (e.g., the first direction DR1 may be either a +X direction or −X direction). In some examples, to distinguish one side from the other side in the particular direction, one side in the particular direction may be referred to as a first side, and the other side in the particular direction may be referred to as a second side. Referring to FIG. 1, a direction indicated by an arrow may be referred to as a first side, and the opposite direction thereof may be referred to as a second side. The first and second directions DR1 and DR2 may be perpendicular to each other, the first and third directions DR1 and DR3 may be perpendicular to each other, and the second and third directions DR2 and DR3 may be perpendicular to each other.

The display device 1 may include a flat area PA and bendable areas RA. The flat area PA of the display device 1 may overlap with an area that exposes a display panel PNL of a panel container SD. The bendable areas RA of the display device 1 may be disposed inside of the panel container SD. The bendable areas RA may be bent with a predetermined curvature radius and may be where the display panel PNL is bent in accordance with the predetermined curvature radius. The bendable areas RA may be disposed on both sides in the first direction DR1 of the flat area PA. For example, a first bendable area RA_1 may be disposed on a second side in the first direction DR1 of the flat area PA, and a second bendable area RA_2 may be disposed on a first side in the first direction DR1 of the flat area PA. The first bendable area RA_1 may be an area where a second area PNL_2 of the display panel PNL is bent, and the second bendable area RA_2 may be an area where a third area PNL_3 of the display panel PNL is bent. As the display device 1 is expanded, the area of the flat area PA may increase. Accordingly, the distance between the first and second bendable areas RA_1 and RA_2 may increase.

Referring to FIGS. 1 through 4, the display device 1 may include the display panel PNL, a first adhesive layer PSA1, a support film 100, a second adhesive film PSA2, a support module SP, and the panel container SD.

The display panel PNL may include any type of display panel such as an organic light-emitting display panel including an organic light-emitting layer, a micro-light-emitting diode (microLED) display panel using microLEDs, a quantum-dot light-emitting diode display panel using a quantum-dot light-emitting layer, or an inorganic light-emitting display panel using inorganic light-emitting element. Referring to FIG. 3, a first surface of the display panel PNL may be the top surface of the display panel PNL, and a second surface of the display panel PNL opposite to the first surface may be the bottom surface of the display panel PNL where the support module SP is disposed.

The display panel PNL may be a flexible panel. The display panel PNL may be flexible enough to be rollable, bendable, or foldable in the panel container SD. The display panel PNL may be slidable along the first direction DR1.

The display panel PNL may include a first area PNL_1 supported by a first support member SP_1 of the support module SP, the second area PNL_2, supported by a second support member SP_2 of the support module SP, and the third area PNL_3 supported by a third support member SP_3 of the support module SP. The first area PNL_1 of the display panel PNL may be flat regardless of the sliding or rolling action of the remaining areas of the display panel PNL. The second and third areas PNL_2 and PNL_3 of the display panel PNL may be areas that are rolled, bent, or folded or are rollable, bendable, or foldable in accordance with the sliding of the display panel PNL.

A display area may be classified into first, second, and third display areas DA_1, DA_2, and DA_3 according to a degree to which the display panel PNL is slid open. For example, the second and third display areas DA_2 and DA_3 may appear depending on whether or not and the degree to which the display panel PNL is slid open. When the display panel PNL is in a fully closed state, e.g., not slid open, the display panel PNL may include the first display area DA_1 having a first area. When the display panel PNL is in a state of being slid open, the display panel PNL may further include the second and third display areas DA_2 and DA_3, which are extensions from the first display area DA_1.

The second display area DA_2 may be located in an area where the second area PNL_2 of the display panel PNL and the flat area PA overlap with each other, and the third display area DA_3 may also be located in an area where the third area PNL_3 of the display panel PNL and the flat area PA overlap with each other. When the display device 1 is slid open to a maximum, the second and third display areas DA_2 and DA_3 may have second and third areas, respectively, and the display area may have a fourth area which is the sum of the first, second, and third areas. For example, the fourth area may be the maximum area of the display area and may correspond to a fully opened state.

The first display area DA_1 may overlap with the first area PNL_1 of the display panel PNL. The second display area DA_2 may overlap with at least part of the second area PNL_2 of the display panel PNL. The third display area DA_3 may overlap with at least part of the third area PNL_3 of the display panel PNL. The boundary between the first and second display areas DA_1 and DA_2 may overlap with the boundary between the first and second areas PNL_1 and PNL_2, and the boundary between the first and third display areas DA_1 and DA_3 may overlap with the boundary between the first and third areas PNL_1 and PNL_3. However, the disclosure is not necessarily limited thereto.

The display panel PNL may further include a subarea SBA. The subarea SBA may be disposed on one side of the first area PNL_1 of the display panel PNL in the second direction DR2. The subarea SBA may be an area that is foldable or bendable. When the subarea SBA is bent, the subarea SBA may overlap with the first area PNL_1 in the third direction DR3. The subarea SBA may have a rectangular shape in a plan view, but the disclosure is not necessarily limited thereto.

The length of the subarea SBA in the first direction DR1 may be substantially the same as the length of the first area PNL_1 in the first direction DR1. In at least one embodiment, the length of the subarea SBA in the first direction DR1 may be less than the length of the first area PNL_1 in the first direction DR1. Further, the length of the subarea SBA in the second direction DR2 may be less than the length of the first area PNL_1 in the second direction DR2, but the disclosure is not necessarily limited thereto.

Referring still to FIG. 3, a driving circuit DC and a circuit board CB may be disposed on one surface of the subarea SBA. The circuit board CB may be attached on the subarea SBA via an anisotropic conductive film (ACF). The circuit board may be electrically connected to a pad unit formed on the subarea SBA. The circuit board CB may include a flexible film such as a printed circuit board (PCB), a flexible PCB (FPCB), or a chip-on-film (COF). The driving circuit DC may be formed as an integrated circuit (IC) and may be attached on the subarea SBA in a chip-on-glass (COG) manner, or a chip-on-plastic (COP) manner, or an ultrasonic manner. In some embodiments, the driving circuit DC may be attached on the circuit board CB.

The support film 100 may prevent the first, second, and third support members SP_1, SP_2, and SP_3 of the support module SP from becoming visible over the display panel PNL and may absorb stress that may be generated from the movement of the first, second, and third support members SP_1, SP_2, and SP_3, thereby preventing the influence of the stress on the display panel PNL. The support film 100 may be attached on the bottom surface of the display panel PNL via the first adhesive layer PSA1, which is interposed between the display panel PNL and the support film 100. The first adhesive layer PSA1 may be a pressure sensitive adhesive (PSA), but the disclosure is not necessarily limited thereto. Referring to FIG. 4, a first surface the support film 100 may be the top surface of the support film 100 on which the first adhesive layer PSA1 is disposed, and a second surface of the support film 100 may be the bottom surface of the support film 100 on which the second adhesive layer PSA2 is disposed.

Figure 9:
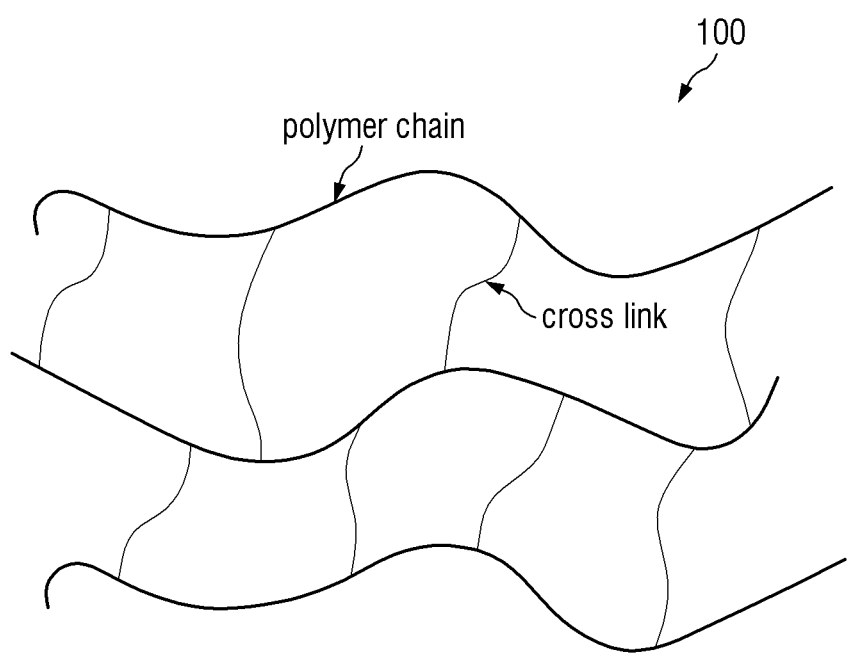
FIG. 9 illustrates the molecular structure of a polymer material that forms the support film of the display device of FIG. 1.

The support film 100 may include a polymer material having an elastic modulus. For example, the support film 100 may include a polymer material in which cross links are formed, as illustrated in FIG. 9. The elastic modulus is a mechanical property that measures the stiffness of a solid material, and refers to Young's modulus, which defines the relationship between the stress (or a force per unit area) and strain (a measure of deformation) of a linear elastic material in a uniaxial deformation region. A large elastic modulus translates into a small strain for unit stress, which means that deformations hardly occur due to stress, and a small elastic modulus translates into a large strain for unit stress, which means that deformations occur easily due to stress. Strain may refer to a variation in the volume and/or length of an object, caused by stress. A large strain translates into a large variation in the volume of an object, and a small strain translates into a small variation in the volume of an object. The support film 100 may have an elastic modulus of 5 MPa or less, but the disclosure is not necessarily limited thereto. This will be described later in detail.

The second adhesive layer PSA2 may bond the support film 100 and the support module SP together. The second adhesive layer PSA2 may be attached on the bottom surface of the support film 100. The elastic modulus of the second adhesive layer PSA2 may be greater than the elastic modulus of the support film 100. Accordingly, the support film 100 may absorb the deformation of the second adhesive layer PSA2 and secure the adhesiveness of the second adhesive layer PSA2, and may prevent joints from being detached from the second adhesive layer PSA2. The second adhesive layer PSA2 may have an elastic modulus of 10 MPa to 200 MPa, but the disclosure is not necessarily limited thereto. This will be described later in detail. The second adhesive layer PSA2 may have an adhesiveness of 500 gf/inch, but the disclosure is not necessarily limited thereto.

The second adhesive layer PSA2 may be a pressure sensitive adhesive (PSA), but the disclosure is not necessarily limited thereto. The width, in the third direction DR3, of the second adhesive layer PSA2 (or the thickness of the second adhesive layer PSA2) may be less than 100 μm, but the disclosure is not necessarily limited thereto.

The support module SP may support the bottom surface of the display panel PNL and may assist with the sliding of the display panel PNL. The support module SP may be attached on the bottom surface of the support film 100 via the second adhesive layer PSA2, which is interposed between the support film 100 and the support module SP. Referring to FIG. 4, the support module SP may include the first, second, and third support members SP_1, SP_2, and SP_3, which are disposed on the bottom surface of the display panel PNL. The support module SP may include a metal, and may secure mechanical strength for supporting the display panel PNL. The support module SP may include a metal such as SUS304, but the disclosure is not necessarily limited thereto.

The first support member SP_1 may support the first area PNL_1 of the display panel PNL. The first support member SP_1 may be disposed on the bottom surface of the first area PNL_1 of the display panel PNL. The first support member SP_1 may have substantially the same shape as the first area PNL_1 in a plan view. For example, the first support member SP_1 may be a plate PT that has a rectangular shape or a rectangle-like shape extending in the first and second directions DR1 and DR2 in a plan view, but the disclosure is not necessarily limited thereto.

The second support member SP_2 may support the second area PNL_2 of the display panel PNL. The second support member SP_2 may be disposed on the bottom surface of the second area PNL_2 of the display panel PNL. The second support member SP_2 may include a plurality of segments SG, which extend in the second direction DR2 and are spaced apart from one another in the first direction DR1. For example, the second support member SP_2 may comprise a group of a plurality of segments SG, which are disposed on the bottom surface of the second area PNL_2 of the display panel PNL.

The third support member SP_3 may support the third area PNL_3 of the display panel PNL. The third support member SP_3 may be disposed on the bottom surface of the third area PNL_3 of the display panel PNL. The third support member SP_3 may include a plurality of segments SG, which extend in the second direction DR2 and are spaced apart from one another in the first direction DR1. For example, the third support member SP_3 may comprise a group of a plurality of segments SG, which are disposed on the bottom surface of the third area PNL_3 of the display panel PNL. The third support member SP_3 may have substantially the same structure as the second support member SP_2.

Referring to FIG. 4, first surfaces disposed on one side in the third direction DR3 the segments SG may be top surfaces SGd of the segments SG that are attached to the support film 100. Second surfaces of the segments SG may be bottom surfaces SGa of the segments SG and may be disposed opposite to the top surfaces SGd in the third direction DR3. Surfaces disposed on one side in the first direction DR1 of the segments SG may be first side surfaces SGb of the segments SG and may connect the top surfaces SGd and the bottom surfaces SGa. Surfaces disposed on the other side in the first direction DR1 of the segments SG may be second side surfaces SGc of the segments SG, and may connect the top surfaces SGd and the bottom surfaces SGa. The segments SG may have a shape whose width in the first direction DR1 decreases in a direction away from the display panel PNL, in a cross-sectional view, but the disclosure is not necessarily limited thereto. For example, the width, in the first direction DR1, of the top surfaces SGd may be greater than the width, in the first direction DR1, of the bottom surfaces SGa.

The width of the first support member SP_1 in the third direction DR3 (e.g., the thickness of the first support member SP_1) may be less than the widths of the second and third support members SP_2 and SP3 in the third direction DR3 (e.g., the thicknesses of the second and third support members SP_2 and SP_3. Accordingly, an air gap corresponding to the difference between the thickness of the first support member SP_1 and the thickness of the second and third support members SP_2 and SP_3 may be formed on a second side of the first support member SP_1. Since the air gap is formed below the first support member SP_1, impact forces applied to the display panel PNL may be mitigated. For example, in response to an object such as a pen dropping onto the first area PNL_1 of the display panel PNL, the air gap may absorb the impact from the object. In this way, a display device according to the present embodiments may have increased reliability.

As illustrated in FIGS. 1 and 2, the panel container SD may accommodate the display panel PNL and at least part of the support module 2000 therein and may assist with the sliding of the display device 1. The panel container SD may include a first container SD_1, which is disposed in the middle of the display device, a second container SD_2, which is disposed on a second side of the first container SD_1 in the first direction DR1 and which includes the first bendable area RA_1, and a third container SD_3, which is disposed on a first side, of the first container SD_1 in the first direction DR1 and which includes the second bendable area RA_2.

The first container SD_1 may connect the second and third containers SD_2 and SD_3. For example, the first container SD_1 may include a first sub-container SD_1a, which connects a first side, of the second container SD_2 and a first side of the third container SD_3 in the second direction DR2, and a second sub-container SD_1b, which connects a second side of the second container SD_2 and a second side of the third container SD_3 in the second direction DR2. For example, as viewed from the perspective of the user engaged in the display device, the first sub-container SD_1a may connect an upper side of the second container SD_2 to an upper side of the third container SD_3, and the second sub-container SD_1b may connect a lower side of the second container SD_2 to a lower side of the third container SD_3.

Rails may be formed on the inside of the second and third containers SD_2 and SD_3 and may guide the sliding of the display panel PNL, but the disclosure is not necessarily limited thereto.

A display device according to a comparative example will hereinafter be described.

Figure 5:
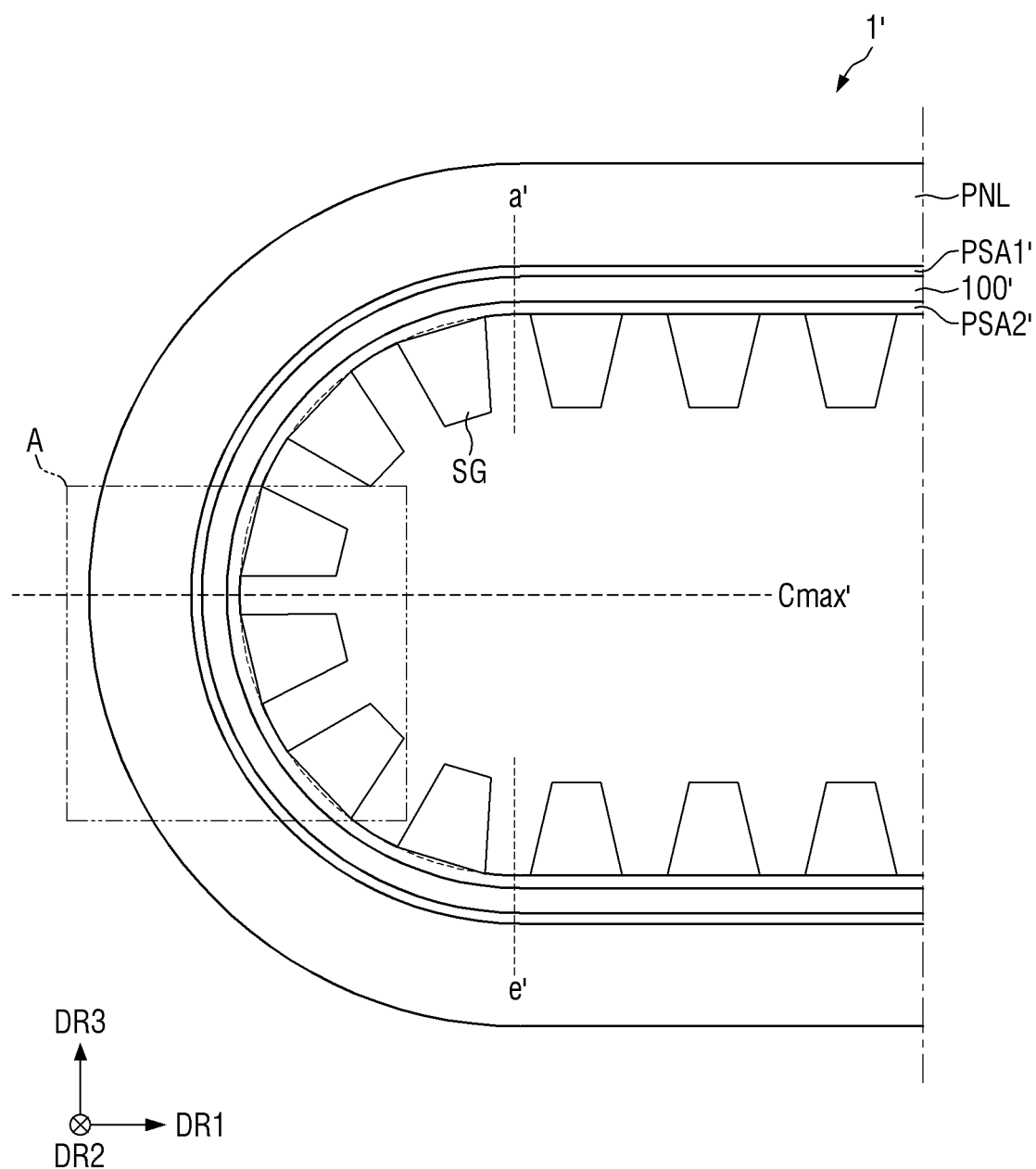
FIG. 5 is a side view of a display device according to a comparative example with its display panel bent in a bendable area.
Figure 6:
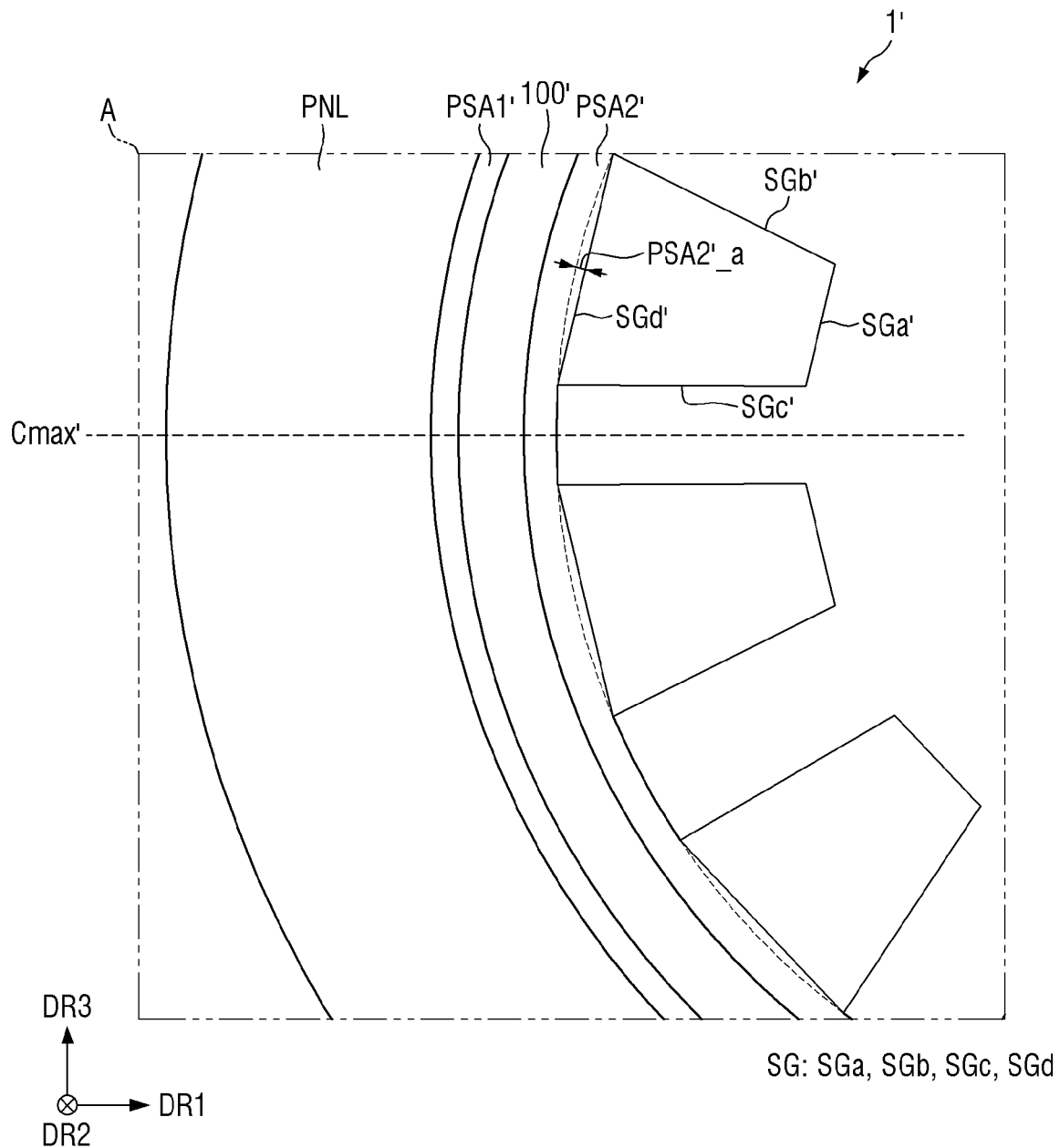
FIG. 6 is an enlarged side view of an area A of FIG. 5.
Figure 7:
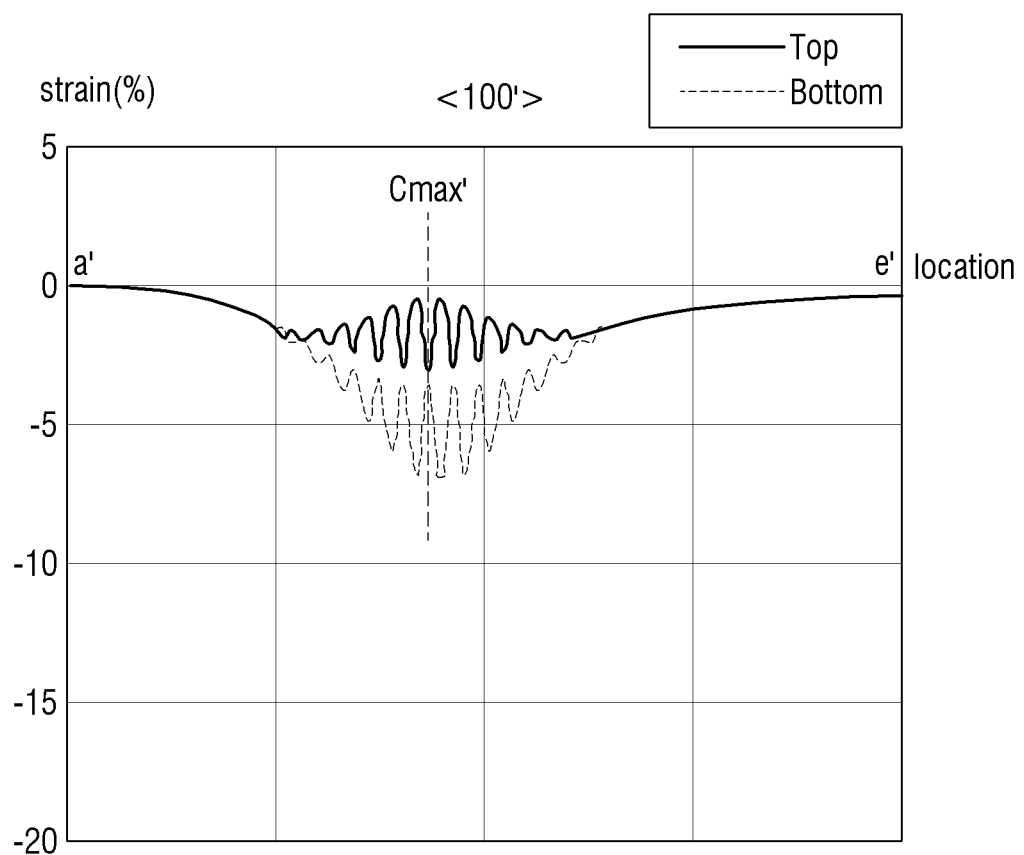
FIG. 7 is a graph that shows strains at different locations in the support film of the display device of FIG. 5.
Figure 8:
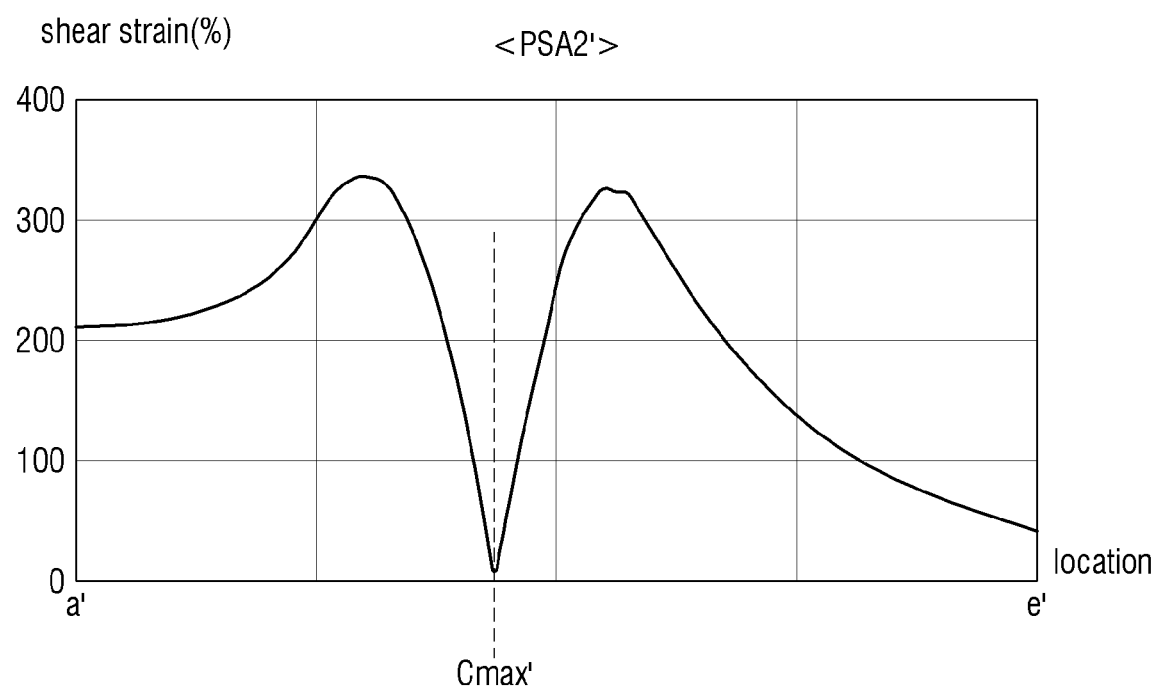
FIG. 8 is a graph that shows shear strains at different locations in a second adhesive layer of the display device of FIG. 5.

FIG. 5 is a side view of a display device according to a comparative example with its display panel bent in a bendable area. FIG. 6 is an enlarged side view of an area A of FIG. 5. FIG. 7 is a graph that shows the strains at different locations in the support film of the display device of FIG. 1. FIG. 8 is a graph that shows the shear strains at different locations in a second adhesive layer of the display device of FIG. 5.

A display device 1' according to a comparative example differs from the display device 1 only in that the elastic modulus of a support film 100' is greater than the elastic modulus of a second adhesive layer PSA2'. Thus, the display device 1' will hereinafter be described, focusing mainly on the difference with the display device 1.

Referring to FIGS. 5 through 8, as the support film 100' and the second adhesive layer PSA2' are bent in a bendable area RA so that stress is applied to the support film 100' and the second adhesive layer PSA2', the support film 100' and the second adhesive layer PSA2' may exhibit strain. A location a' in the bendable area RA defines where the bending of a display panel PNL begins, and a location e' defines where the bending of the display panel PNL ends. A maximum bend location Cmax' defines where the display panel PNL is bent to its maximum.

The strain of the support film 100' may vary from one location to another location. A negative strain may refer to the support film 100' being compressed. The magnitude of the strain may refer to the absolute value of strain. For example, a strain of −5% may correspond to a strain magnitude of 5%. For example, for a negative strain, the greater the magnitude of strain for an object, the more the object is compressed, and the less the magnitude of strain, the less the object is compressed.

The support film 100' may be compressed in the bendable area RA, and accordingly may have a negative strain in the bendable area RA. The strain magnitude of the support film 100' may gradually increase along a direction from the location a' to the maximum bend location Cmax', reach its maximum at the maximum bend location Cmax', and gradually decrease along a direction from the maximum bend location Cmax' to the location e'. For example, the compression of the support film 100' may become increasingly severe from the location a' to the maximum bend location Cmax' and may be increasingly alleviated from the maximum bend location Cmax' to the location b'. The strain of the support film 100' may be greater at the bottom surface than at the top surface of the support film 100'.

The shear strain of the second adhesive layer PSA2' may vary from one location to another location. Shear strain may refer to an angular distortion or change (e.g., a change in lateral distance) between the top and bottom surfaces of an object due to shear stress. The greater the shear strain of an object, the greater the displacement and the angular distortion between the top and bottom surfaces of the object, and the less the shear strain of the object, the less the displacement and the angular distortion between the top and bottom surfaces of the object.

The shear strain of the second adhesive layer PSA2' may be inversely proportional to the strain of the support film 100' near the maximum bend location Cmax'. For example, the shear strain of the second adhesive layer PSA2' may gradually decrease along the direction from the location a' to the maximum bend location Cmax', reach its minimum at the maximum bend location Cmax', and gradually increase along the direction from the maximum bend location Cmax' to the location e'. This is because, as the strain of the support film 100' becomes relatively large near the maximum bend location Cmax', the stress applied to the second adhesive layer PSA2' is reduced. In other words, the greater the strain of the support film 100' near the maximum bend location Cmax', the less the stress applied to the second adhesive layer PSA2', and the less the shear strain of the second adhesive layer PSA2'.

As the elastic modulus of the support film 100' is greater than the elastic modulus of the second adhesive layer PSA2', the strain of the support film 100' may be relatively small, which may cause the stress applied to the second adhesive layer PSA2' may increase. Accordingly, the shear strain of the second adhesive layer PSA2' may become relatively large. For example, as vertical stress is applied in a direction from the support film 100' to segments SG, deformed parts PSA2' a of the second adhesive layer PSA2' may be formed, as illustrated in FIG. 6. As the sliding of the display panel PNL is continued, fatigue accumulates due to the formation of the deformed parts PSA2' a of the second adhesive layer PSA2', and as a result, the segments SG may be detached from the second adhesive layer PSA2' of the comparative example display device.

If the elastic modulus of the second adhesive layer PSA2' is reduced to prevent the formation of the deformed parts PSA2'_a of the second adhesive layer PSA2', then sufficient adhesiveness for bonding the second adhesive layer PSA2' and the segments SG may not be able to be secured. For example, since here the elastic modulus and the adhesiveness of the second adhesive layer PSA2' are generally proportional to each other, the adhesiveness of the second adhesive layer PSA2' may be reduced if the elastic modulus of the second adhesive layer PSA2' is reduced. As a result, the segments SG may be detached from the second adhesive layer PSA2'.

Unlike the comparative example, the stress applied to the second adhesive layer PSA2 is reduced by lowering the elastic modulus of the support film 100 below the elastic modulus of the second adhesive layer PSA2 to prevent the formation of the deformed parts PSA2'_a, and to secure sufficient adhesiveness. The support film 100 and the second adhesive layer PSA2 of the display device 1 will hereinafter be described.

Figure 10:
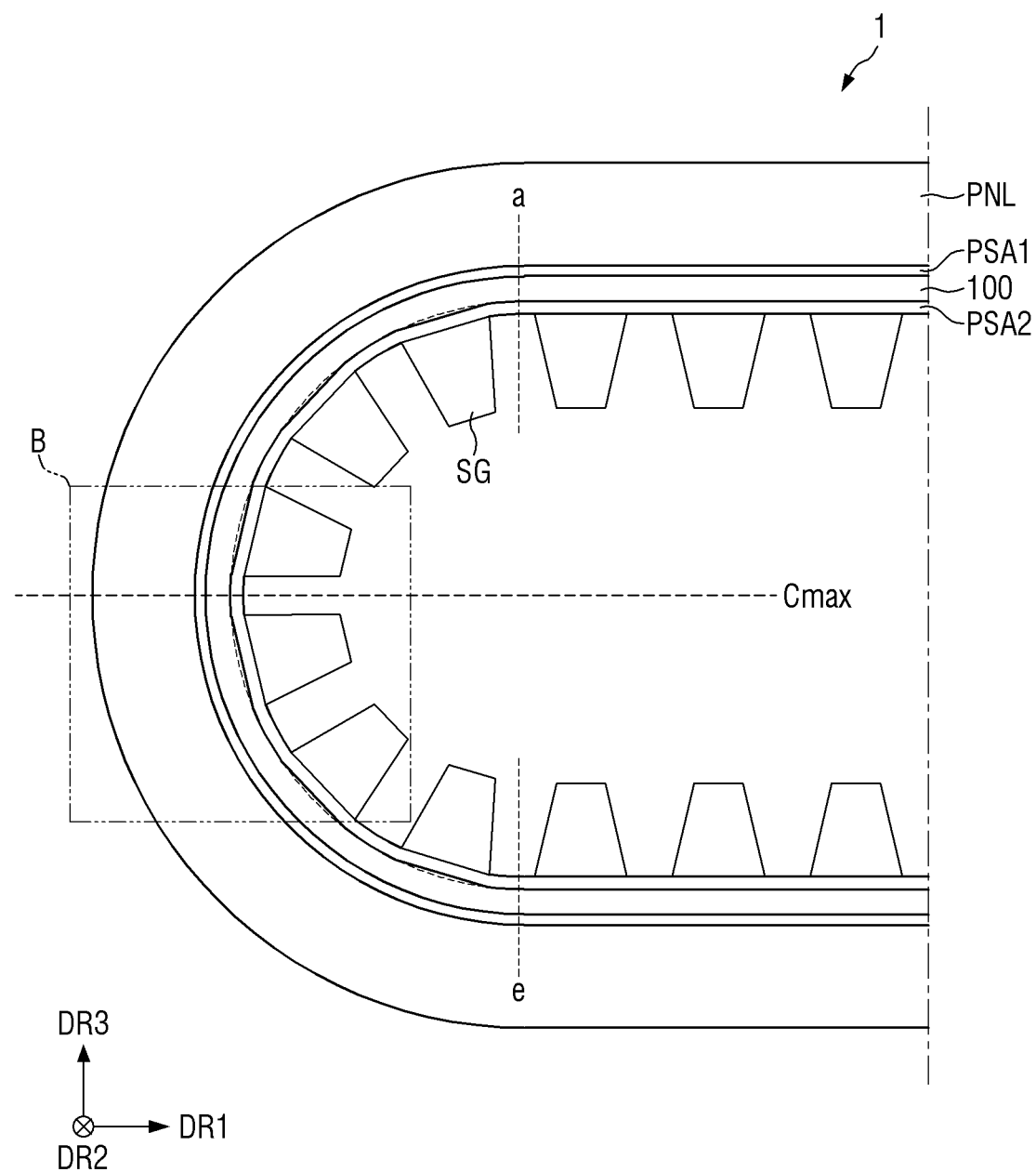
FIG. 10 is a side view of the display device of FIG. 1 with its display panel bent in a bendable area.
Figure 11:
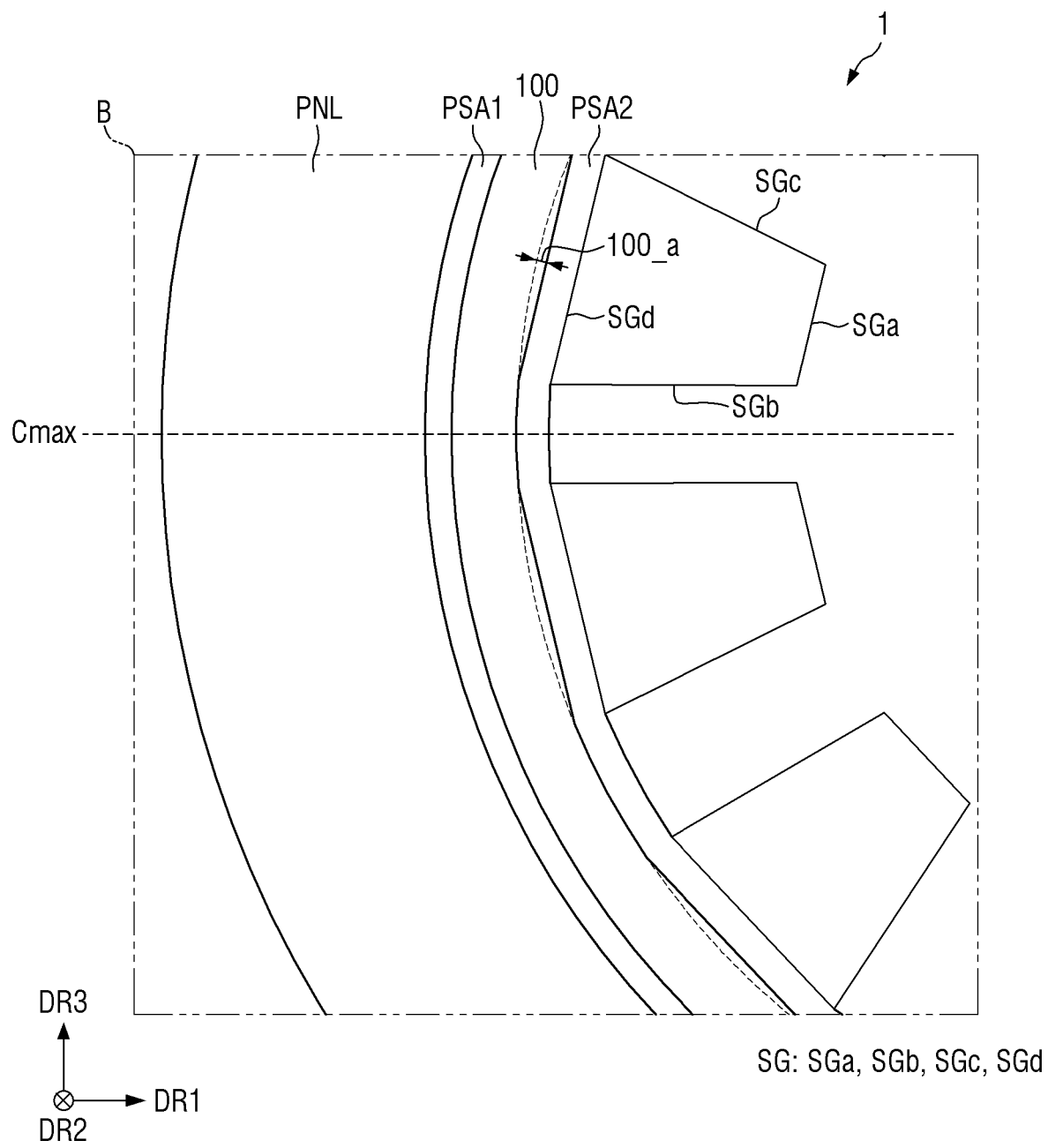
FIG. 11 is an enlarged side view of an area B of FIG. 10.
Figure 12:
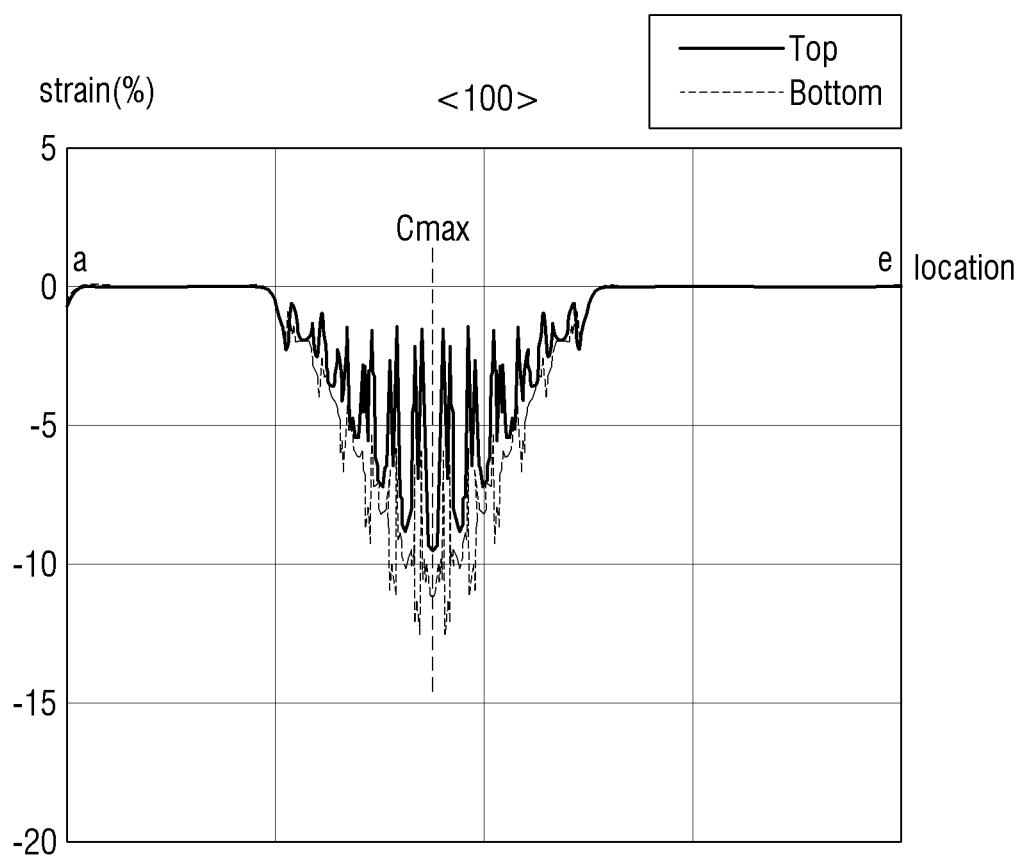
FIG. 12 is a graph that shows strains at different locations in the support film of the display device of FIG. 1.
Figure 13:
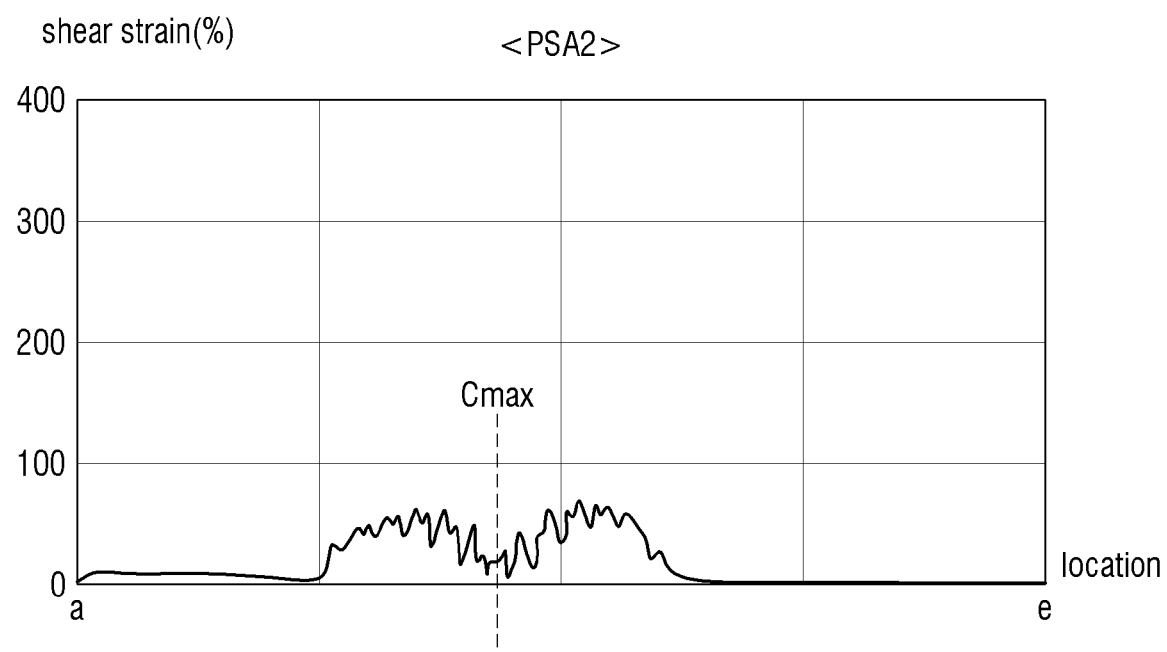
FIG. 13 is a graph that shows shear strains at different locations in a second adhesive layer of the display device of FIG. 1.

FIG. 9 illustrates the molecular structure of a polymer material included in embodiments of the support film of the display device of FIG. 1. FIG. 10 is a side view of the display device of FIG. 1 with its display panel bent in a bendable area. FIG. 11 is an enlarged side view of an area B of FIG. 10. FIG. 12 is a graph that shows the strains at different locations in the support film of the display device of FIG. 1. FIG. 8 is a graph that shows the shear strains at different locations in a second adhesive layer of the display device of FIG. 1.

Referring to FIG. 9, the support film 100 of the display device 1 may include a polymer material in which cross links are formed. For example, the polymer material included in the support film 100 may have a structure in which a plurality of cross links are formed between polymer chains.

A cross-linked polymer in which cross links are formed may generally have a relatively small elastic modulus. Thus, the support film 100 may have a large variation in shape in response to a relatively low stress. The support film 100 including the cross-linked polymer may have an elastic modulus of 5 MPa or less, but the disclosure is not necessarily limited thereto.

The cross-linked polymer may have a thermosetting property. A thermosetting property refer to a resistance to deformation once cured by heat, even when heat is applied again. Accordingly, this physical property of a thermosetting material may hardly change with temperature. This will be described later.

One example of the cross-linked polymer is polyurethane (PU) where methylene diphenyl diisocyanate (MDI) and polyether polyol are urethane-bonded, but the disclosure is not necessarily limited thereto. For convenience, a thermosetting polymer will hereinafter be described as being, for example, thermosetting PU.

Referring to FIGS. 10 through 13, as the support film 100 and the second adhesive layer PSA2 are bent in a bendable area RA so that stress is applied to the support film 100 and the second adhesive layer PSA2, the support film 100 and the second adhesive layer PSA2 may exhibit strain. A location a defines where the bending of the display panel PNL begins, and a location e defines where the bending of the display panel PNL ends, and a maximum bend location Cmax defines where the display panel PNL is bent to its maximum.

The support film 100 may have a negative strain (e.g., may be compressed) in the bendable area RA. The strain of the support film 100 may vary from one location to another location. The strain of the support film 100 may gradually increase along a direction from the location a to the maximum bend location Cmax, reach its maximum at the maximum bend location Cmax, and gradually decrease along a direction from the maximum bend location Cmax to the location e.

Since the support film 100 has a relatively small elastic modulus, the strain of the support film 100 may increase under stress. The support film 100 may have a smaller elastic modulus than the second adhesive layer PSA2. The support film 100 may have a strain of 5% or greater at the maximum bend location Cmax, but the disclosure is not necessarily limited thereto. The support film 100 may have an elastic modulus of 5 MPa or less, but the disclosure is not necessarily limited thereto. The strain of the support film 100 may be greater at the bottom surface than the top surface of the support film 100.

The shear strain of the second adhesive layer PSA2 may vary from one location to another location. The shear strain of the second adhesive layer PSA2 may be inversely proportional to the strain of the support film 100 near the maximum bend location Cmax. For example, the shear strain of the second adhesive layer PSA2 may gradually decrease along the direction from the location a to the maximum bend location Cmax, reach its minimum at the maximum bend location Cmax, and gradually increase along the direction from the maximum bend location Cmax to the location e. This is because, as the strain of the support film 100 becomes relatively large near the maximum bend location Cmax, the stress applied to the second adhesive layer PSA2 is reduced.

The support film 100 of the display device 1 may have a relatively small elastic modulus and may thus have a relatively large strain in response to stress. In other words, the support film 100 can be compressed to a relatively large degree. As a result, as vertical stress is applied in a direction from the support film 100 towards the segments SG, deformed parts 100_a of the support film 100 may be formed near the top surfaces SGd of the segments SG, as illustrated in FIG. 11.

As the elastic modulus of the support film 100 is reduced so that the deformed parts 100_a are formed, the stress applied to the second adhesive layer PSA2 may be reduced, and as a result, the shear strain of the second adhesive layer PSA2 may also be reduced. Accordingly, the segments SG may be prevented from being detached from the second adhesive layer PSA2, because deformed parts of the second adhesive layer PSA2 are not formed (see FIG. 6 for the comparative example in which deformed parts of the second adhesive layer PSA2' are formed). The second adhesive layer PSA2 may have a shear strain of less than 100%, but the disclosure is not necessarily limited thereto.

As the stress applied to the second adhesive layer PSA2 decreases, the elastic modulus of the second adhesive layer PSA2 may increase, and as a result, the adhesiveness of the second adhesive layer PSA2 may also increase. The second adhesive layer PSA2 may have an elastic modulus of 10 MPa to 200 MPa, but the disclosure is not necessarily limited thereto. The second adhesive layer PSA2 may have an adhesiveness of 500 gf/inch, but the disclosure is not necessarily limited thereto.

As mentioned above, since the strain of the support film 100 of the display device 1 is relatively large, the stress applied to the second adhesive layer PSA2 can be reduced, and as a result, the segments SG can be prevented from being detached from the second adhesive layer PSA2. Since the segments SG remain attached, a display device according to embodiments of the present disclosure may have increased reliability.

It will hereinafter be described how the physical property of the support film 100 changes with temperature.

Figure 14:
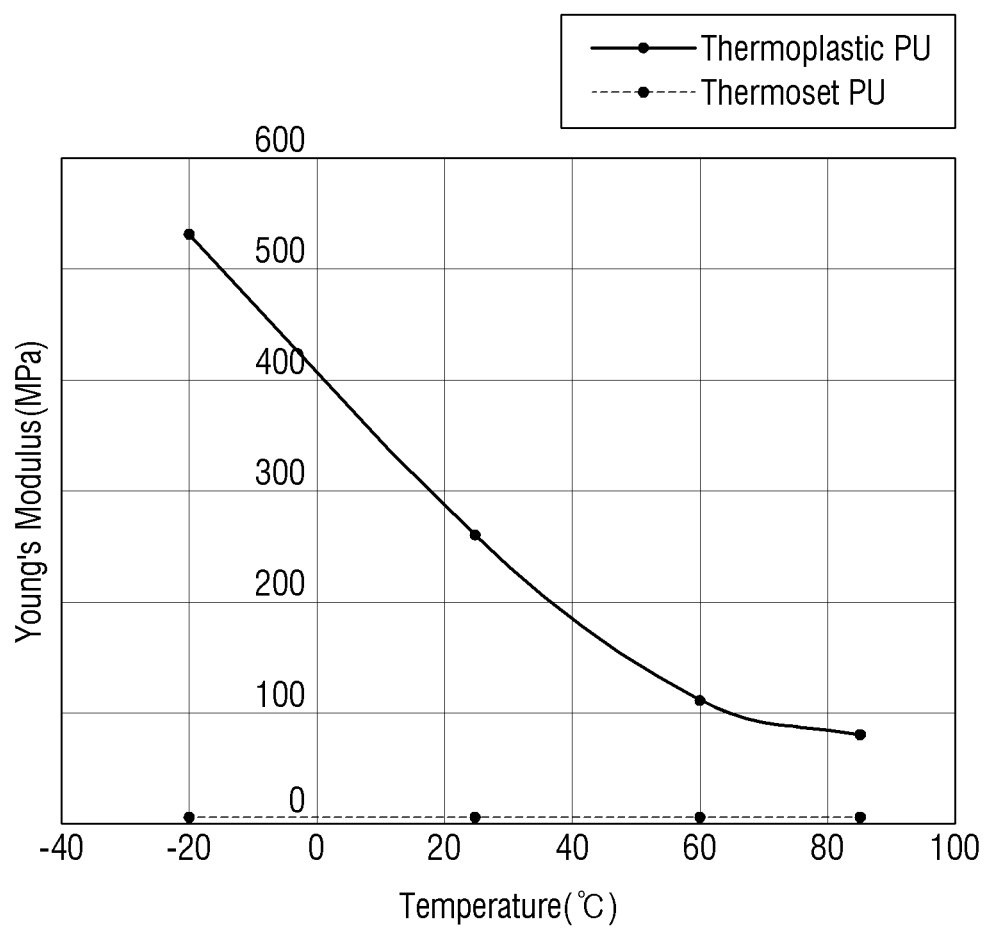
FIG. 14 is a graph that shows variation of the moduli of thermoplastic and thermosetting polymers against temperature.
Figure 15:
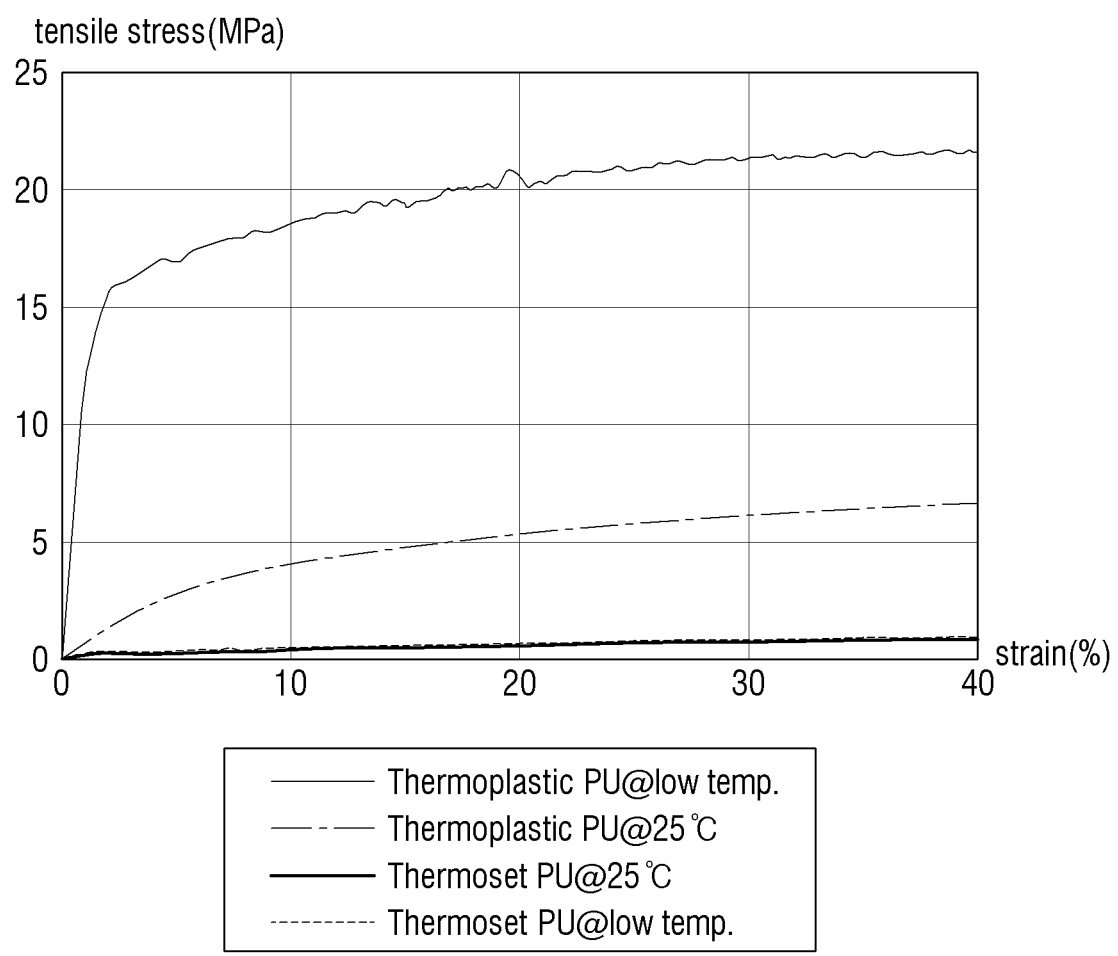
FIG. 15 is a graph that shows variation of the strains of thermoplastic and thermosetting polymers against temperature.

FIG. 14 is a graph that shows the variation of the moduli of thermoplastic and thermosetting polymers against temperature. FIG. 15 is a graph that shows the variation of the strains of thermoplastic and thermosetting polymers against temperature. Referring to FIG. 15, "low temp." refers to a temperature of −20° C.

Referring to FIGS. 14 and 15, as the support film 100 includes a thermosetting polymer, the support film 100 may have a substantially uniform physical property (e.g., modulus) at various temperatures.

For example, as illustrated in FIG. 14, the support film 100 may have a uniform elastic modulus regardless of the temperature. The support film 100 may have a substantially uniform elastic modulus at a temperature of −20° C. to 85° C., but the disclosure is not necessarily limited thereto.

Since a thermosetting polymer is generally cross-linked, the thermosetting polymer may generally have a small elastic modulus. Thus, the support film 100 may have a relatively uniform low elastic modulus regardless of the temperature and may thus have a large strain for a small stress regardless of the temperature, as illustrated in FIG. 15.

Therefore, the segments SG can be prevented from being detached from the second adhesive layer PSA2.

In concluding the detailed description, those skilled in the art will appreciate that variations and modifications can be made to the embodiments without departing from the scope of the present disclosure as defined by the appended claims. Therefore, the disclosed embodiments of the inventive concepts are used in a generic and descriptive sense only and not for purposes of limitation.

What is claimed is:

1. A display device comprising:
 a display panel including bendable portions;
 a support film attached on a bottom surface of the display panel;
 a first adhesive layer directly disposed on a bottom surface of the support film;
 a plurality of segments directly disposed on a bottom surface of the first adhesive layer and spaced apart from one another in a first direction; and
 a plate part disposed directly on the bottom surface of first adhesive layer and interposed between segments of the plurality of segments,
 wherein a thickness of the plate part is less than a thickness of the plurality of segments, and wherein the support film has a smaller elastic modulus than the first adhesive layer.

2. The display device of claim 1, wherein the support film has an elastic modulus of 5 MPa or less.

3. The display device of claim 2, wherein the support film includes a thermosetting polymer.

4. The display device of claim 2, wherein the first adhesive layer has an adhesiveness of 500 gf/inch or greater.

5. The display device of claim 1, further comprising:
 a flat portion of the display panel, wherein the flat portion is configured to remain flat during a closed state, and wherein the bendable portions of the display panel are configured to bend in the closed state,
 wherein:
 each of the bendable portions includes a maximum bend location where the display panel is bent to its maximum in the closed state,
 the support film has a first surface, which is adjacent to the bottom surface of the display panel, and
 wherein the first surface of the support film has a strain magnitude of 5% or greater at the maximum bend location.

6. The display device of claim 5, wherein:
 the first adhesive layer has a second surface, which is adjacent to the support film, and
 wherein the second surface of the first adhesive layer has a shear strain of 100% or less in the bendable portions.

7. The display device of claim 1, wherein:
 the display panel includes a first area, a second area, and a third area,
 wherein the first area is a flat area, and is configured to remain flat in an opened state and a closed state of the display device,
 wherein the second area is disposed on a first side of the first area, and is configured to bend or curve when the display device transitions from the opened state to the closed state,
 wherein the third area is disposed on a second side of the first area opposite the first side, and is configured to bend or curve when the display device transitions from the opened state to the closed state, and
 wherein the plurality of segments overlap with the second and third areas in a thickness direction, but do not overlap the first area in the thickness direction.

8. The display device of claim 7, wherein the plurality of segments extend in a second direction orthogonal to the first direction and the thickness direction.

9. The display device of claim 1, further comprising:
 an air gap disposed below the plate part.

10. A display device comprising:
 a display panel configured to slide in a first direction and including a flat portion, a first bendable portion, and a second bendable portion;
 a support film attached on a bottom surface of the display panel; and
 a plurality of segments disposed on a bottom surface of the support film and spaced apart from one another, wherein the plurality of segments overlap the first bendable portion and the second bendable portion in a thickness direction; and
 a plate part disposed on the bottom surface of the support film, and overlapping the flat portion of the display panel and not overlapping the plurality of segments in the thickness direction, wherein a distance between the bottom surface of the support film and a bottom of the plate part in the thickness direction is less than a distance between the bottom surface of the support film and bottom surfaces of the plurality of segments in the thickness direction.

11. The display device of claim 10, wherein the support film includes a thermosetting polymer and wherein the support film includes a cross-linked polymer.

12. The display device of claim 11, wherein the support film has an elastic modulus of 5 MPa or less when its temperature is between −20° C. and 85° C.

13. The display device of claim 12, wherein the support film has a substantially constant modulus when its temperature is between −20° C. and 85° C.

14. The display device of claim 13, further comprising:
 a first adhesive layer disposed between the support film and the plurality of segments,
 wherein the first adhesive layer has a greater elastic modulus than the support film.

15. The display device of claim 14, wherein the first adhesive layer has an adhesiveness of 500 gf/inch.

16. A display device comprising:
 a display panel configured to slide in a first direction and including a flat portion, a first bendable portion, and a second bendable portion;
 a support film attached on a bottom surface of the display panel; and
 a plurality of segments disposed on a bottom surface of the support film and spaced apart from one another, wherein the plurality of segments overlaps the first bendable portion and the second bendable portion in a thickness direction,
 wherein the support film includes a thermosetting polymer,
 wherein the display panel includes a first area, a second area, and a third area,
 wherein the first area overlaps with the flat portion of the display device in the thickness direction, and is configured to remain flat in an opened state and a closed state of the display device,
 wherein the second area is disposed on a first side of the first area and overlaps with the first bendable portion of the display device in the thickness direction, and is configured to bend or curve when the display device transitions from the opened state to the closed state, wherein the third area is disposed on a second side of the first area opposite the first side and overlaps with the second bendable portion of the display device in the thickness direction, and is configured to bend or curve when the display device transitions from the opened state to the closed state, and wherein the plurality of segments overlap with the second and third areas, but not with the first area.

17. The display device of claim 16, wherein the plurality of segments extend in a second direction orthogonal to the first direction and the thickness direction, and are spaced apart from one another in the first direction.

18. The display device of claim 14, wherein:

a thickness of the plate part is less than a thickness of the segments.

19. The display device of claim 18, wherein:

an air gap disposed below the plate part.

* * * * *